United States Patent

Prines et al.

[11] 4,257,092
[45] Mar. 17, 1981

[54] TRACTION MOTOR CURRENT CONTROL APPARATUS

[75] Inventors: Frank J. Prines, Murrysville; Thomas C. Matty, North Huntingdon Township, Westmoreland County; James H. Franz, Murrysville, all of Pa.

[73] Assignee: Westinghouse Electric Corp., Pittsburgh, Pa.

[21] Appl. No.: 968,950

[22] Filed: Dec. 13, 1978

Related U.S. Application Data

[63] Continuation of Ser. No. 803,194, Jun. 3, 1977, abandoned.

[51] Int. Cl.³ .................. H02M 3/32; H02P 7/28
[52] U.S. Cl. .................. 363/124; 307/252 M; 318/345 C; 318/345 G; 318/341
[58] Field of Search ............ 318/341, 345 G, 345 C; 323/22 SC; 307/252 K, 252 M; 363/124

[56] References Cited

U.S. PATENT DOCUMENTS

| | | | |
|---|---|---|---|
| 3,544,873 | 12/1970 | Gunsser et al. | 318/376 |
| 3,582,764 | 6/1971 | Huber | 323/22 SC |
| 3,594,629 | 7/1971 | Kawakami et al. | 318/345 G |
| 3,614,386 | 10/1971 | King | 307/252 M |
| 3,660,738 | 5/1972 | Anderson et al. | 318/345 C |
| 3,753,077 | 8/1973 | Anderson et al. | 318/345 C |
| 3,784,890 | 1/1974 | Geirsbach et al. | 318/345 G |
| 3,841,238 | 10/1974 | Thompson et al. | 318/345 C |
| 3,879,620 | 4/1976 | Akamatsu | 307/252 M |

*Primary Examiner*—David Smith, Jr.
*Attorney, Agent, or Firm*—R. G. Brodahl

[57] ABSTRACT

A direct current motor power controlling chopper apparatus is disclosed which determines the operational speed of one or more traction motors propelling a passenger vehicle along a track. The speed of the motor is established by changing the ON and OFF conduction ratio or duty cycle relationship of a thyristor switch device to determine the field current and the armature voltage of that motor. The present apparatus can provide a greater controlled range of motor speeds including a lower minimum OFF operation and a full ON capacity. In addition, the present apparatus provides greater reliability due to less thermal stress on the thyristor switch devices and fewer circuit elements required to provide an improved motor current control operation.

12 Claims, 18 Drawing Figures

4,257,092

TRACTION MOTOR CURRENT CONTROL APPARATUS

This is a continuation of application Ser. No. 803,194, filed June 3, 1977, now abandoned.

BACKGROUND OF THE INVENTION

It is known in the prior art to control the speed of a direct current series traction motor by a chopper apparatus including a thyristor switch device in series with the motor. Speed control of the motor is provided by varying the width of voltage pulses supplied to the motor such that the resulting average power supplied to the motor establishes the operational speed thereof. A charged capacitor has been used to provide a biased voltage across the conducting thyristor device for commutating the conduction of that thyristor device. A traction motor is operative in a motoring mode when the passenger vehicle is being propelled along a track, and in a braking mode when the vehicle is being stopped or decelerated.

As described in a published article in the Westinghouse Engineer for Mar. 1973, at pages 34 to 41, the average voltage applied to the motor armature is controlled by adjusting the ratio of chopper OFF time to the chopper ON time with the resulting average motor current determining the motor torque for moving the vehicle along the track.

It is well known to persons skilled in this art, when operating a d-c traction motor at a controlled deceleration or acceleration rate, the motor current is controlled, whereas to maintain a desired speed, the motor voltage is controlled.

SUMMARY OF THE INVENTION

The present invention provides an improved motor current controlling chopper apparatus which can continuously operate at full rated motor currents in either one of an ON condition or an OFF condition of operation without a thermal stress failure of the thyristor switch devices. The present invention provides a more reliable motor current control apparatus in that fewer circuit component elements are required for a given rating of load current that is controlled and a more reliable operation is provided, with a decreased thermal stress on the thyristor switching devices and lower chopper cost.

DESCRIPTION OF THE PREFERRED EMBODIMENT

Figure 1:
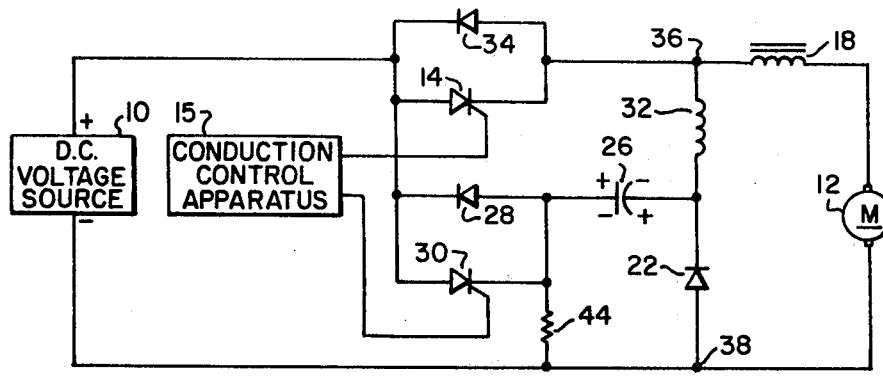
FIG. 1 shows the motor current control apparatus of the present invention.
Figure 2:
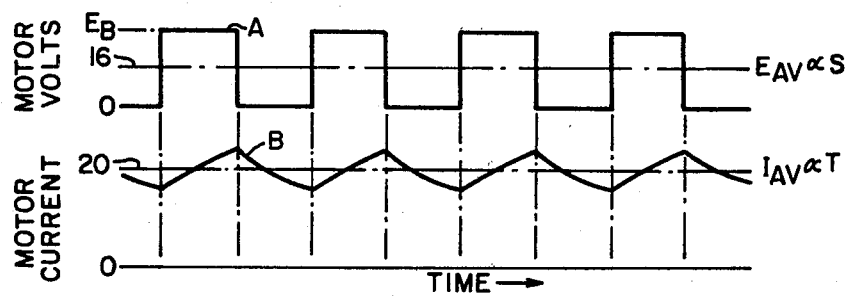
FIG. 2 shows the motor voltage and motor trend provided by the apparatus of FIG. 1.

In FIG. 1, there is shown a direct current chopper apparatus for controlling the average current supplied from a direct current source 10 to a DC motor load 12, and including a series main thyristor switch device 14 that repetitively operates in an ON condition and an OFF condition to chop the voltage applied to the load 12. The control of this voltage is determined by changing the ON operation time in relation to the OFF operation time of the conduction by the main thyristor 14, for controlling the speed of the motor 12. The speed of a DC series field traction motor is proportional to the armature voltage and inversely proportional to the field current or field flux in accordance with the relationship S proportional to $E/\phi$. To reduce the speed of the motor 12, the armature voltage is decreased, and to increase the motor speed the armature voltage is increased. The power supply for a typical traction motor application can be a relatively constant direct current voltage source such as 900 volts from a central power station. The main thyristor switch 14 is gated to close and become conductive and subsequently commutated to open and block as required to provide an average voltage across the motor 12 which determines the motor speed. Each time the main thyristor switch conducts, the voltage across the motor 12 and inductor 18 rises to the voltage $E_B$ of the power supply 10 as shown in the motor voltage curve A of FIG. 2. Each time the main thyristor 14 blocks the voltage across the motor 12 and inductor 18 falls to zero as shown by the curve A. The motor 12 responds to the average motor voltage 16. If the main thyristor switch 14 remains conductive for a longer time period, this raises the average motor voltage 16, and if the main thyristor switch 14 remains blocking for a longer time period, this lowers the average motor voltage 16. The motor current increases as shown by curve B of FIG. 2 each time the main thyristor switch 14 becomes conductive and then decreases each time the main thyristor switch 14 blocks, with the inductive effect of the motor 12 and the motor reactor choke 18 causing the current waveshape shown in curve B. The average motor current 20 is proportional to the torque of the motor 12. The free wheeling diode 22 allows the motor current to continue due to the inductance of the circuit after the main thyristor switch 14 blocks to result in the motor current having the waveshape of curve B.

Figure 3:
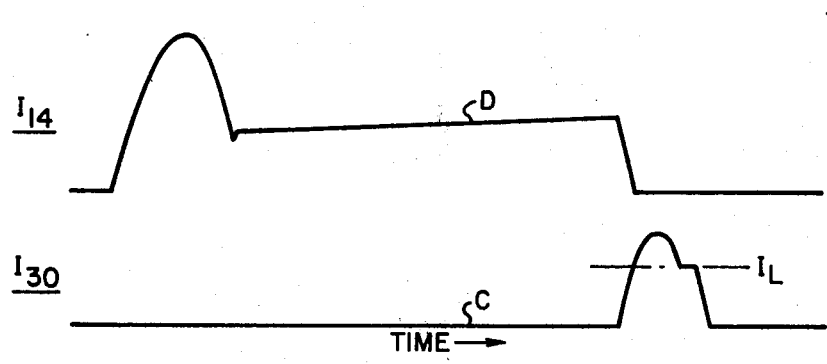
FIG. 3 shows the current waveforms for the thyristor switches of FIG. 1.

The main thyristor switch 14 requires a commutation circuit to become blocked when it is desired that the main thyristor switch 14 no longer conduct current to the motor 12. A commutation circuit including a parallel connected commutating capacitor 26 and a commutating thyristor switch 28 is operative to shunt the motor current and stop conduction by the main thyristor switch 14. To block the main thyristor switch 14 and stop conduction of motor current by the main thyristor switch 14, the commutating thyristor 30 is gated to conduct and applies a reverse bias voltage from the capacitor 26 across the main thyristor switch 14 to block the thyristor switch 14. While the motor current at this time follows the shunt path through the commutating thyristor 30, the capacitor 26 is then charged up in a reverse direction, as shown above the capacitor 26 and opposite to the power source 10, to discontinue the motor current flow through the commutating thyristor 30 and that thyristor 30 regains a blocking state and stops conducting. Any overcharge of the capacitor 26 is clamped to the voltage source 10 by the diodes 28 and 22, reverse biasing thyristor 30 and further assuring turn off of the thyristor 30. During a prolonged off period, it is necessary to pulse on the thyristor 30 to sustain the charge voltage of the capacitor 26. It is important that the number of devices utilized to affect this commutation of the main thyristor 14 be minimized to lower the cost of the circuit apparatus and improve the reliability of the motor current control apparatus. The commutating thyristor 30 carries in effect, an impulse of current for a substantially shorter time duration as shown by curve C of FIG. 3 when compared to the current passed by the main thyristor 14 as shown by curve D.

Figure 4:
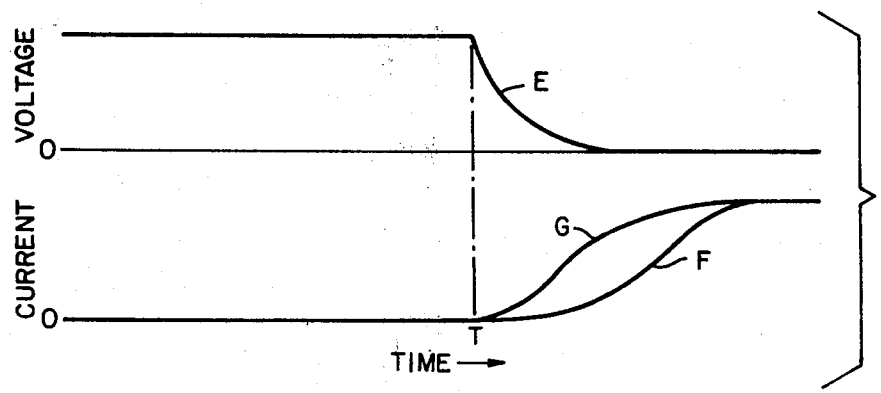
FIG. 4 shows voltage and current waveforms to illustrate typical current rate of change conditions of a thyristor switch operation.

In FIG. 4, there are shown voltage and current waveforms to illustrate the typical current rate of change or DI/DT of a thyristor switch operation. The curve E shows the voltage across a thyristor switch and the curve F shows the resulting current buildup when the thyristor switch becomes conductive at time T with inductive reactance included in the circuit. The current is zero when the thyristor is blocked and not conducting. It is desired to control the current buildup since the product of current and voltage represents the power dissipated in the thyristor switch and by restricting the DI/DT rate of current buildup, the thermal stress on the thyristor switch is reduced. The curve G would represent a much higher power dissipation and higher thermal stress on the thyristor switch. It is generally desired to limit the current rate of change DI/DT to a value less than 50 amperes per microsecond of time. The effect of DI/DT limited to below that value on the life of the newer and fast switching thyristors is to substantially extend their operational life and to improve the reliability of those devices, while older thyristor designs require lower values of DI/DT for reliable operation.

In relation to FIG. 1, and the motor current control apparatus of the present invention, it is initially desired to gate to an ON condition of operation the commutating thyristor switch 30 to become conductive which will charge the commutating capacitor 26 through a circuit including the commutating inductor 32, the motor reactor 18 and the motor 12 in relation to the DC voltage source 10. The capacitor 26 will charge to the voltage of the DC voltage source 10 as shown above the capacitor 26 and maybe a slight overcharge of the voltage might occur greater than the supply voltage due to the inductance in this charging circuit. However, the diodes 22 and 28 in effect clamp the voltage across the capacitor 26 to the voltage value of the DC source 10 so it does not charge to a voltage substantially greater than the voltage of the DC source 10. The next operation is to gate ON the main thyristor switch 14 to become conductive and pass current to the load motor 12. The current flow of the main thyristor switch 14 will reverse the charge on capacitor 26 as shown below the capacitor 26 and cause a reverse bias on the commutating thyristor 30 such that the thyristor 30 now returns to the blocking state.

Figure 6:
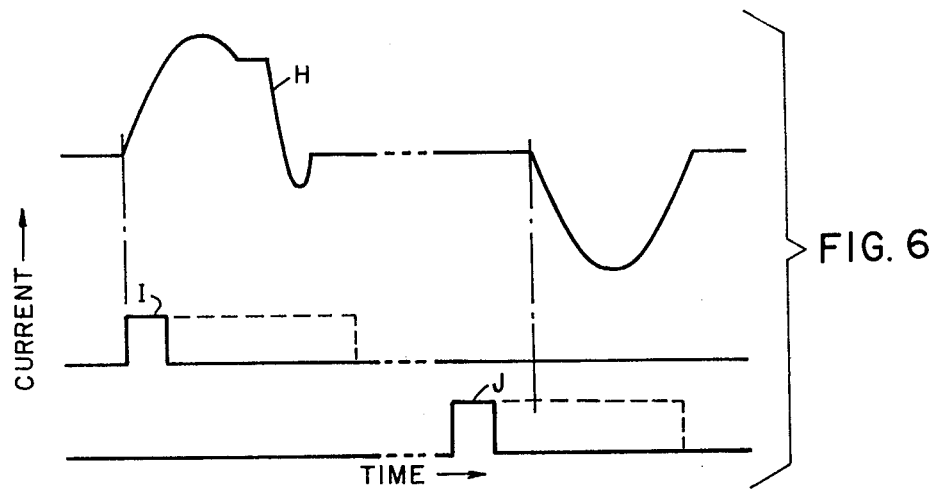
FIG. 6 illustrates the charging current of the commutating thyristors in relation to the OFF and ON gate pulses to the motor current control apparatus of FIG. 1.

The charging current cycle for the capacitor 26 is shown in curve H of FIG. 6 in relation to the gate pulse shown in curve I for turning ON the commutating thyristor 30 and the gate pulse shown in curve J for turning ON the main thyristor switch 14. Upon the turn-on of the main thyristor 14, the capacitor 26 will discharge to zero and then recharge in the opposite direction as shown below the capacitor 26 in FIG. 1. After a complete charge in the opposite direction, the commutating thyristor 30 is blocked by the reverse bias provided by the clamping of the capacitor voltage to the supply voltage by diode 28 and 22. The capacitor 26 is charged in the proper direction for the commutation of the main thyristor 14.

When it is desired to commutate the main thyristor switch 14 a pulse is supplied to gate the ON condition of operation of the commutating thyristor 30 to become conductive and permit a commutating current to flow through the diode 34 to apply a reverse bias voltage across the main thyristor 14 to cause the thyristor 14 to block and stop conducting. At this time, the load currents supplied to motor 12 flows through the commutating thyristor 30 and charges the capacitor 26 in reverse direction as shown above the capacitor 26. When the commutating thyristor 30 is gated ON the current flowing through that thyristor 30 builds up until it reaches the load current value for the motor 12. The current for the main thyristor 14 has to fall off at the same rate. The inductor 18 and motor 12 comprise a large inductance, but does not want to see a change in the load current through the load 12. During the commutation of the main thyristor 14, the current through the load motor 12 remains substantially constant. The current through the commutating thyristor 30 increases from zero to the load current as shown in curve K of FIG. 7 and the current passing through the main thyristor 14 falls to zero as shown by the curve L. There is now excess voltage across the capacitor 26 so the current through the commutating thyristor 30 goes above the load current as shown by the curve K. One component of the current flowing through the commutating thyristor 30 goes to the load motor 12 and another component of that current flows back to the diode 34 to result in a voltage drop across the diode 34 to provide a reverse bias on the main thyristor 14 to cause that thyristor 14 to block and stop conducting, as shown by curve L of FIG. 7. The time period TQ above the load current has to be adequate for the thyristor 14 to go back to a blocking state. As the charging current through the capacitor 26 decreases to the load current, the voltage builds up on the capacitor 26 to the value of the supply voltage of the source 10 as shown above the capacitor 26, the current passing through the commutating thyristor 30 will decrease as shown by the curve K. The inductance of the load circuit wants to keep the current flowing in the load motor 12 so a current now begins to flow through the free wheeling diode 22 as shown by the curve M of FIG. 7. The current supplied by the commutating capacitor 26 falls off as shown by curve K and then the current through the free wheeling diode 22 increases as shown by the curve M until it reaches the value of the load current. The capacitor 26 is now charged to the original polarity shown above the capacitor 26 with no current flowing through either the main thyristor 14 or the commutating thyristor 30.

Before the current flowing through the diode 22 falls off to zero, a gate ON pulse is supplied to cause load current to flow through the main thyristor 14 to the load motor 12. When the main thyristor 14 is gated ON to become conductive, the current flowing through the diode 22 will become zero due to the positive polarity of the circuit junction 36 relative to the circuit junction 38. This means that the voltage of the source 10 is applied to the diode 22 when that diode 22 is carrying forward current, and the blocking condition recovery of the diode 22 is necessary to prevent damage of the diode 22. With inductance in the circuit, when the diode 22 rapidly becomes blocking, this inductance tries to maintain the current flowing in the circuit including the diode 22 to result in a high voltage spike across the diode 22 which could exceed the diode voltage rating of that device and damage the diode 22. To avoid this condition, the prior art practice has been to provide a shunt snubber circuit across the diode to limit the peak voltage seen by the diode upon returning to a blocking state. With the magnitude of this voltage peak depending upon the recovery time of the diode 22 and with the longer the recovery time providing a greater current buildup in the inductor and a larger voltage spike to result when a large current is beng switched to zero. For this reason, a more expensive and fast recovery diode has been required in the place of the diode 22 with a shunt snubber across the diode for its protection. The circuit apparatus of the present invention as shown in FIG. 1 does not require such an expensive and fast recovery diode. Since the circuit is designed to avoid a high voltage spike across the diode 22 upon the blocking recovery of this diode, the energy stored in the inductor 32 wants to continue the current flow through the diode 22 but a suitable conduction path is here provided through the capacitor 26, the diode 28 and the thyristor 14, and only a gradually increasing voltage is applied across the diode 22 depending upon the values of inductor 32 and capacitor 26. In addition, there is no need for a snubber circuit to shunt the diode 22 during the blocking recovery of the diode 22. This provides less stress on the diode 22 to make the operation of that diode more reliable.

Figure 8:
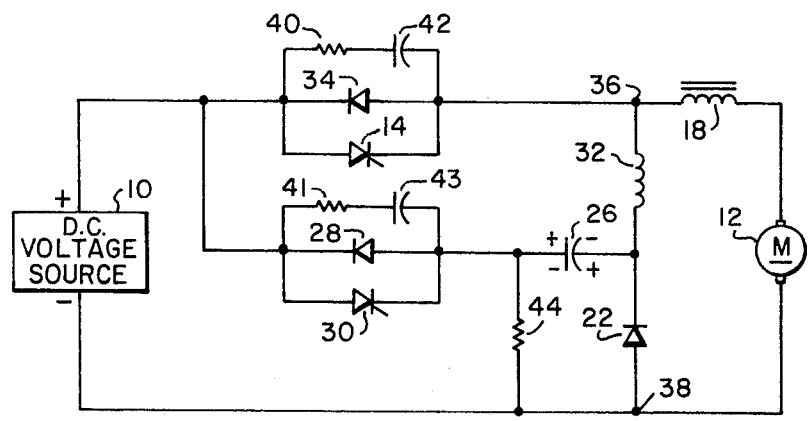
FIG. 8 illustrates R-C circuits provided in conjunction with the motor current control apparatus of FIG. 1 to assist the turn ON of the thyristors.
Figure 9:
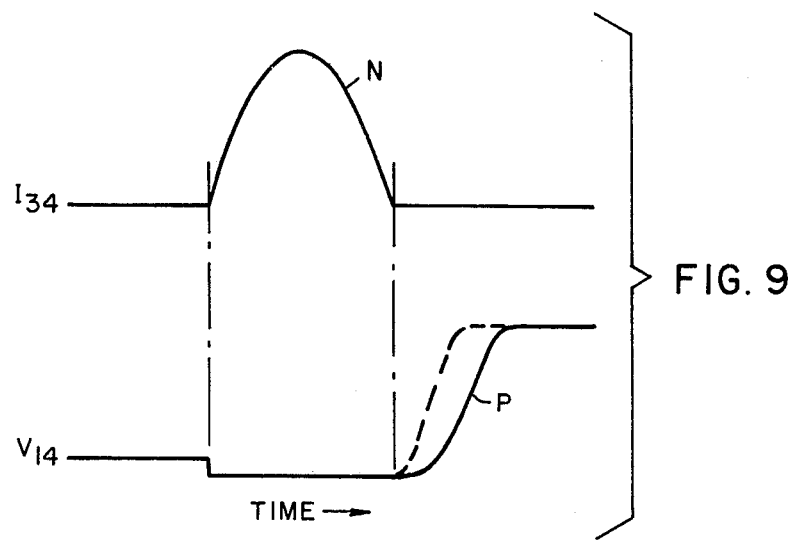
FIG. 9 illustrates voltage across the main thyristor device and the current through the shunt diode connected across that main thyristor switch device.

In FIG. 8 there is shown the motor current control apparatus of the present invention including R-C circuits to shunt each of the semiconductor diodes 34 and 28 and the thyristor switch devices 14 and 30 for limiting the rate of applied voltage to these devices. Once the current ceases to flow through these diodes, for example, in FIG. 9 there is shown the current through the diode 34 as curve N and the voltage across the main thyristor 14 is shown by curve P. The voltage across the main thyristor 14 goes from zero when it is conducting and when that thyristor 14 is blocked and the diode 34 is conducting there is a reverse voltage across the thyristor 14 of about one volt corresponding to the voltage drop across the diode 34. When the current stops flowing through the diode 34 due to the commutating capacitor 26 discharging, the voltage across the main thyristor 14 begins to rise since the commutating capacitor 26 is now almost charged in the opposite direction to block the commutating thyristor 30. The capacitor 26 is charged to almost the supply voltage right across the main thyristor 14 so that this thyristor 14 now has a high rate of change of voltage DV/DT. If nothing is done to limit the rate of change of voltage across the main thyristor 14, that thyristor 14 may malfunction to gate ON and become conducting since the thyristor 14 may not have been able to sustain a very rapid change of voltage within a short time period after it has previously been conducting. The circuit including resistor 40 and capacitor 42 is provided to cause the voltage buildup rate to be more gradual across the main thyristor 14 as shown by curve P. It is desired to keep the voltage buildup rate of change DV/DT below 100 volts per microsecond. The other reason for the circuit including the resistor 40 and capacitor 42 concerns the operation of fast switching thyristor devices. In effect, a small internal thyristor device is employed to gate ON a larger main thyristor 14 to provide a sharp current increase having a high DI/DT applied to the gate and the gate area spread out to make the thyristor 14 fast switching. The circuit contains stored energy in the charge on the capacitor 42 to assist in the faster turn-on of the main thyristor 14. In general, the motor current control apparatus shown in FIG. 8 does not have a particular requirement for the provision of the circuit relating to a high DI/DT condition. But the snubber circuit is desired and is provided for these other reasons to assist the faster gating of the main thyristor 14.

The resistor 44 is provided to maintain the charge on capacitor 26. When the commutating thyristor 30 becomes conducting, the resistor 44 can be selected to keep thyristor 30 conducting and the capacitor 26 charged in the direction shown above the capacitor 26. When the commutating thyristor 30 is blocking and the main thyristor 14 is conducting, the capacitor 26 then charges as shown below the capacitor 26 and the capacitor 26 can maintain as charged by a current flow through the resistor 44. It probably requires about 10 or so operating cycles for the capacitor 26 to charge to its full value if this is accomplished only by the path provided through the resistor 44.

Figure 7:
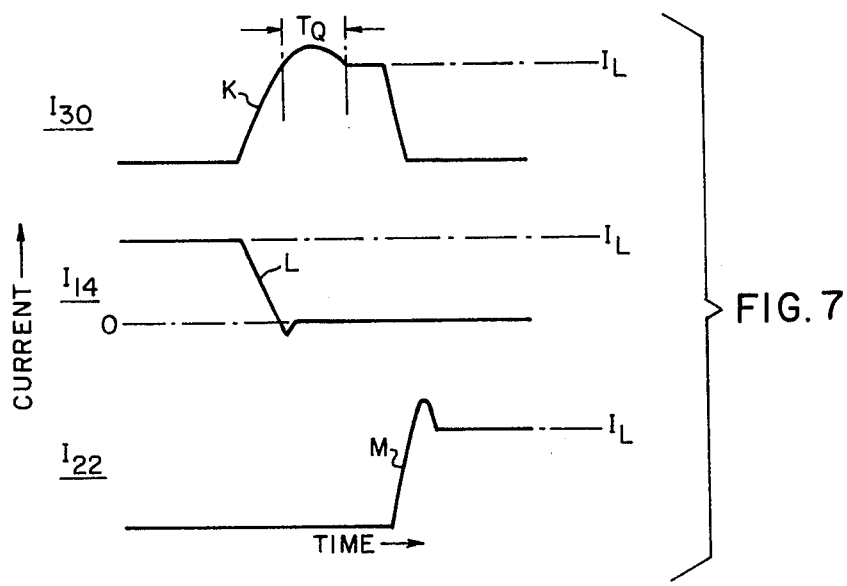
FIG. 7 illustrates the commutating thyristor current buildup in relation to the main thyristor current and the free wheeling diode current.
Figure 10:
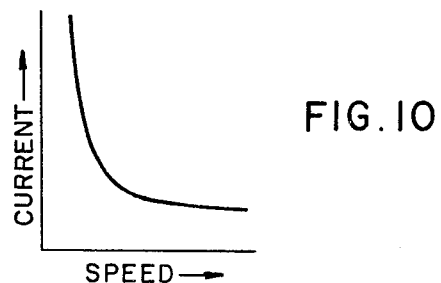
FIG. 10 illustrates the well-known operational characteristic of a direct current series motor.

For a series traction motor application, a momentarily high load current can occur. The time duration TQ is shown in FIG. 7 when the load current flow through the commutating thyristor 30 is above the load current value. As load current rises, the time period TQ reduces and may not be long enough for the main thyristor 14 to turn OFF and become blocking, which could result in the motor 12 speeding up and the load current increasing to a higher level until the motor reaches a maximum speed and then stops accelerating when the load current would thereafter reduce to a lower level as shown by the operational characteristic of a series motor shown in FIG. 10. At low speed, the current is high, but as the motor speed builds up the motor current falls. The resistor 44 functions to allow the commutating capacitor 26 to recharge through the resistor 44 when commutation is lost such that should gating ON of the commutating thyristor 30 fail to commutate the main thyristor 14 due to the conducted load current level being too high in relation to the main thyristor 14, this recharging of the commutating capacitor 26 would provide another opportunity for commutating the operation of the main thyristor 14. The higher the voltage charge on the commutator 26, the better able it is to commutate the main thyristor 14.

The inductor 32 shown in FIG. 8 protects all semiconductor diode and thyristor devices in the circuit in relation to an objectionally high current rate of change DI/DT.

The current control apparatus of the present invention as shown in FIG. 1 is relatively immune to misgating of the thyristor devices. During operation, if both the thyristor switch devices 14 and 30 are turned on at the same time, the circuit will not malfunction after the capacitor 26 has been charged. If the capacitor is charged as shown above the capacitor 26 when it is desired to gate ON the main thyristor 14, it does not really matter that the commutating thyristor 30 is also gated ON at the same time since that thyristor 30 is reverse biased and the gate ON pulse applied to thyristor 30 will not cause any malfunction of that thyristor 30. If the capacitor 26 is charged as shown below the capacitor 26 and it is desired to gate ON the thyristor 30 to commutate the main thyristor 14, if a gate ON pulse is also supplied at this time to the main thyristor 14, it causes no malfunction of the apparatus since that main thyristor 14 is reverse biased and the supply of the gate ON pulse to the main thyristor 14 does not cause an operational problem of the current control apparatus. A typical prior art chopper current control apparatus requires additional protection against misgating because the loss of the commutation capability in relation to the main thyristor switch such that a full ON mode of operation can result for the main thyristor switch and be difficult to terminate other than by disconnecting the DC voltage source from that main thyristor switch. Some circuits would operate at a minimum duty cycle and in other circuits the thyristors would be stressed due to gating with high values of reverse voltage.

For the current control apparatus of the present invention shown in FIG. 8, if one of the commutating thyristor 30 or the shunt diode 28 shorts out, the circuit goes to a relatively low duty cycle of operation because were the commutating thyristor 30 to short out and the main thyristor 14 were gated ON to be conductive, the main thyristor 14 would begin to supply current to the motor 12 and the current also would cycle through the now shorted commutating thyristor 30 and charge the capacitor 26 in the reverse direction shown below the capacitor 26 to turn off the main thyristor 14. Thusly, the current supplied to the motor 12 is reduced and the motor 12 slows down to a relatively low and safe operating speed.

Figure 5:
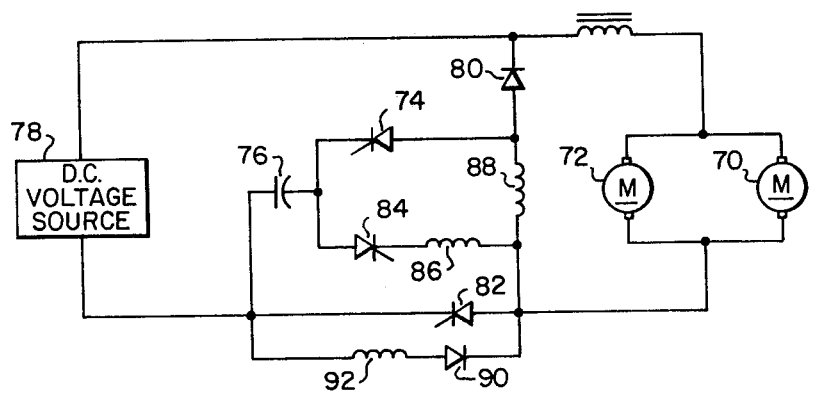
FIG. 5 shows a prior art motor current control apparatus for a series traction motor.

In FIG. 5 there is illustrated the prior art current control apparatus described in the published article in the Westinghouse Engineer for March 1973 at pages 34 to 41. This current control apparatus is shown connected in the motoring mode and feeding two motor circuits 70 and 72 each of which could have one or more traction motors connected in series. The first OFF pulse turns ON the commutating thyristor 72 to charge the commutating capacitor 76 to the same voltage and polarity as the voltage source 78. With the capacitor 76 charging to a value of twice the voltage of the source 78 due to the circuit inductance if it were not for the operation of the free wheeling diode 80. When the charge voltage on the capacitor 76 reaches the line voltage level, the current through the capacitor 76 and the thyristor 74 goes to zero and the thyristor 74 stops conducting. An ON pulse now occurs to turn ON simultaneously the main thyristor 82 and the reversing loop thyristor 84 which connects the load motors 70 and 72 directly to the voltage source 78 and motor current builds up. In addition, the voltage charge on the capacitor 76 as shown above the capacitor begins to decay as current flows through the thyristor 84, the reversing loop inductor 86 and the thyristor 82 and the thyristor 84 now turns OFF when the latter current has reached zero and the voltage charge on the capacitor 76 has reversed as shown below the capacitor 76. The load current is still flowing through the load motors 70 and 72 at this time. The turn-off of this load current is accomplishing by turning ON the commutating thyristor 74 which causes the load current to flow through the commutating thyristor 74 and capacitor 76. After a short time delay due to the inductor 88, the main thyristor 82 turns OFF and the diode 90 conducts to help speed the charging of the capacitor 76 with the inductor 92 limiting the rate of rise of the current through the diode 90. The diode 90 stops conducting before the capacitor 76 charges the voltage of the source 78. When the capacitor 76 has charged the voltage of the source 78, the free wheeling diode 80 conducts load current and the commutating thyristor turns OFF to leave the circuit ready for the next ON pulse to start the main thyristor 82 conducting the load current through the motors 70 and 72.

The present current control chopper apparatus has an arrangement of the components in the commutating circuit to permit the use of standard diodes for the free wheeling diode 22 rather than the need of more expensive fast recovery diodes. The process used by diode device manufacturers to obtain fast recovery diodes reduces the reverse blocking voltage of the diode by approximately 50% as compared with a standard diode. Thus, in high voltage applications that require diodes connected in series to meet the voltage requirements of the system, twice as many fast recovery diodes are required, resulting in a significant increase in chopper costs. The reduction in free wheeling diode costs are achieved in the present apparatus without any increase in the number of components used in the remaining portion of the circuit. In fact, the circuit uses the minimum number of components required for a fixed frequency and variable pulse width type of chopper circuit.

Figure 11:
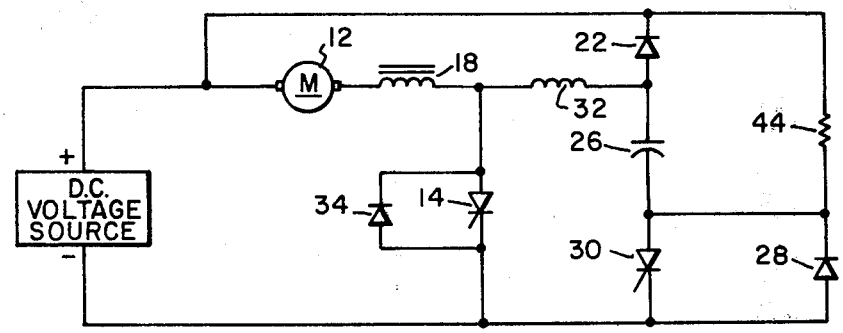
FIG. 11 illustrates the equivalent circuit for the present chopper apparatus connected in the negative circuit arrangement.

In FIG. 1 there is shown the present chopper current control apparatus connected to the positive DC line and the equivalent circuit for the present apparatus when connected to the negative DC line is shown in FIG. 11.

Diode 34 is optional and provides a soft commutation of thyristor 14, and prevents voltages greater than the supply voltage from appearing across the output terminals 36 and 38 and establishes a nearly constant commutation interval for all load levels. For typical traction motor loads containing relatively high inductance, a single inductor 32 provides resonant charging of the commutating capacitor 26 and DI/DT protection for all of the semiconductors. Because of the circuit configuration, none of the devices are subjected to voltage spikes and require no snubber circuits to protect the devices. However R-C networks can be placed across thyristors 14 and 30 to limit the rate of reapplied voltage and assist turn-on and can be also used for voltage balance when two or more devices are placed in series.

Figure 12:
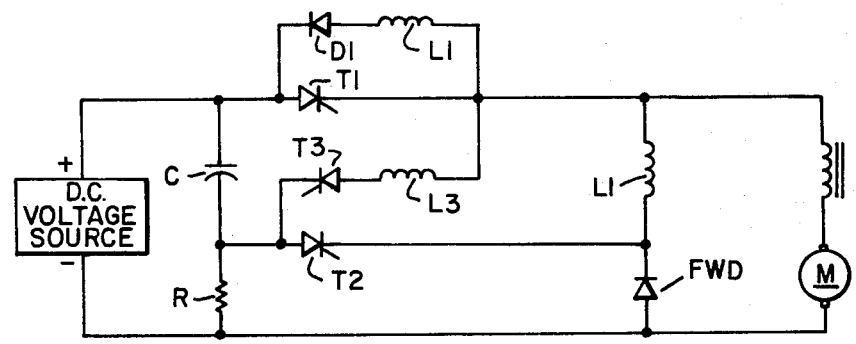
FIG. 12 shows a prior art chopper apparatus connected in a positive circuit arrangement.
Figure 13:
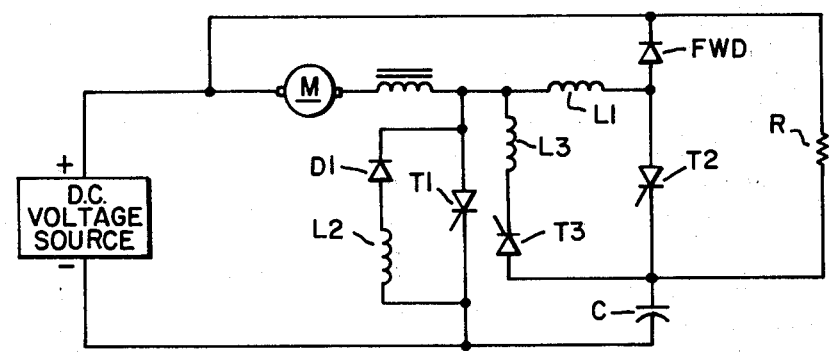
FIG. 13 shows the chopper apparatus of FIG. 12 connected in a negative circuit arrangement.
Figure 14:
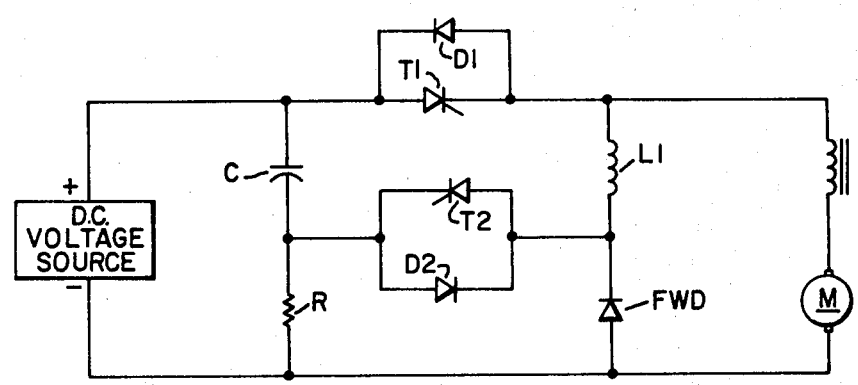
FIG. 14 shows another prior art chopper apparatus connected in a positive circuit arrangement.
Figure 15:
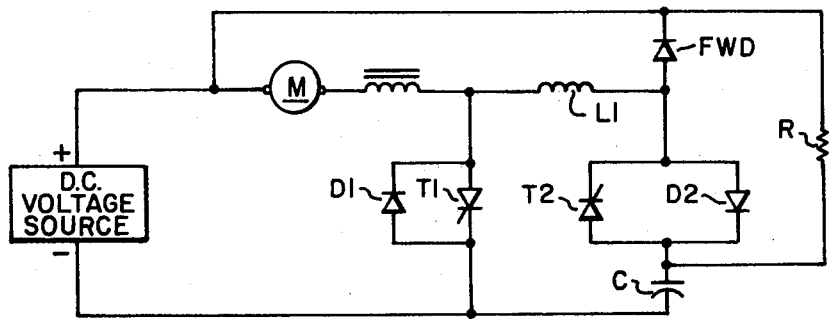
FIG. 15 shows the chopper apparatus of FIG. 14 connected in a negative circuit arrangement.

An example of a known prior art chopper apparatus is shown in FIG. 12 for a positive supply connected chopper and an equivalent negative supply connected chopper is shown in FIG. 13. This circuit employs three thyristors and at least two inductors resulting in a higher cost chopper apparatus. In addition, the circuit requires voltage suppression circuits to protect the devices from high voltage spikes although the physical size and cost of these suppressors may be reduced by using fast recovery diodes. Another known prior art chopper apparatus circuit is shown in FIG. 14 as a positive connected circuit arrangement and in FIG. 15 as a negative connected circuit arrangement, which reduces the number of components required, but must employ fast recovery diodes and voltage suppressor circuits to prevent damage to the semiconductors.

Figure 16:
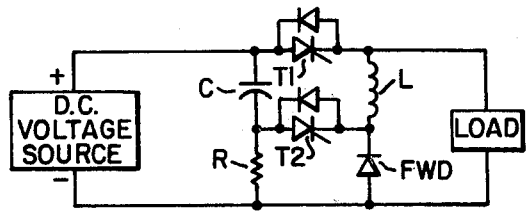
FIG. 16 shows a different prior art chopper apparatus.

In FIG. 16 there is shown a prior chopper apparatus which provides no charging current path for maintaining the required voltage charge on the commutating capacitor, after the chopper apparatus has been operating in an ON condition to energize the load for an extended period of time.

The present chopper apparatus has the following advantages desirable on large traction motor applications.

1. Commutation voltage does not appear at the chopper output 36 and 38, thus, the maximum voltage applied to the load motor 12 is limited to the supply voltage.

2. Only one thyristor 30 is required for the commutation circuit.

3. A single inductor 32 provides both resonant charging of the commutating capacitor 26 and DI/DT protection for all semiconductor devices.

4. A failed one of commutating devices 28 or 30 does not damage the other commutating device.

5. A shorted commutating device 28 or 30 results in the chopper operating at a minimum duty cycle rather than a full ON mode.

6. The commutating capacitor 26 is held at full line voltage when charged to either polarity.

7. Commutation or switch off of the chopper apparatus is completed in only ½ cycle after gating ON of the commutation thyristor 30, as based on the resonant frequency of inductor 32 and capacitor 26.

8. A snubber circuit is not required to limit the reapplied DV/DT to thyristor 30.

9. The chopper apparatus circuit arrangement permits the use of RCT's or low reverse voltage thyristors.

10. The free wheeling diode 22 does not require a snubber circuit and need not be selected for a minimum fast recover time.

11. The current through the inductor 32 is either the commutating current or the free wheeling current, thus the rating of the inductor 32 is lower than in prior art chopper circuits.

12. By properly connecting the motor circuit across the thyristor 14, the chopper circuit provides reliable electrical braking of a traction system.

13. Misgating of thyristors 14 and 30 due to spurious signals does not cause a failure of the chopper apparatus.

14. By adequately sizing inductor 32 to limit the DI/DT during switching and the use of fast switching thyristors, the maximum junction temperature excursion and the increased average junction temperature are held to reasonable values. As a result, any reduction in device life or reliability is insignificant.

Figure 17:
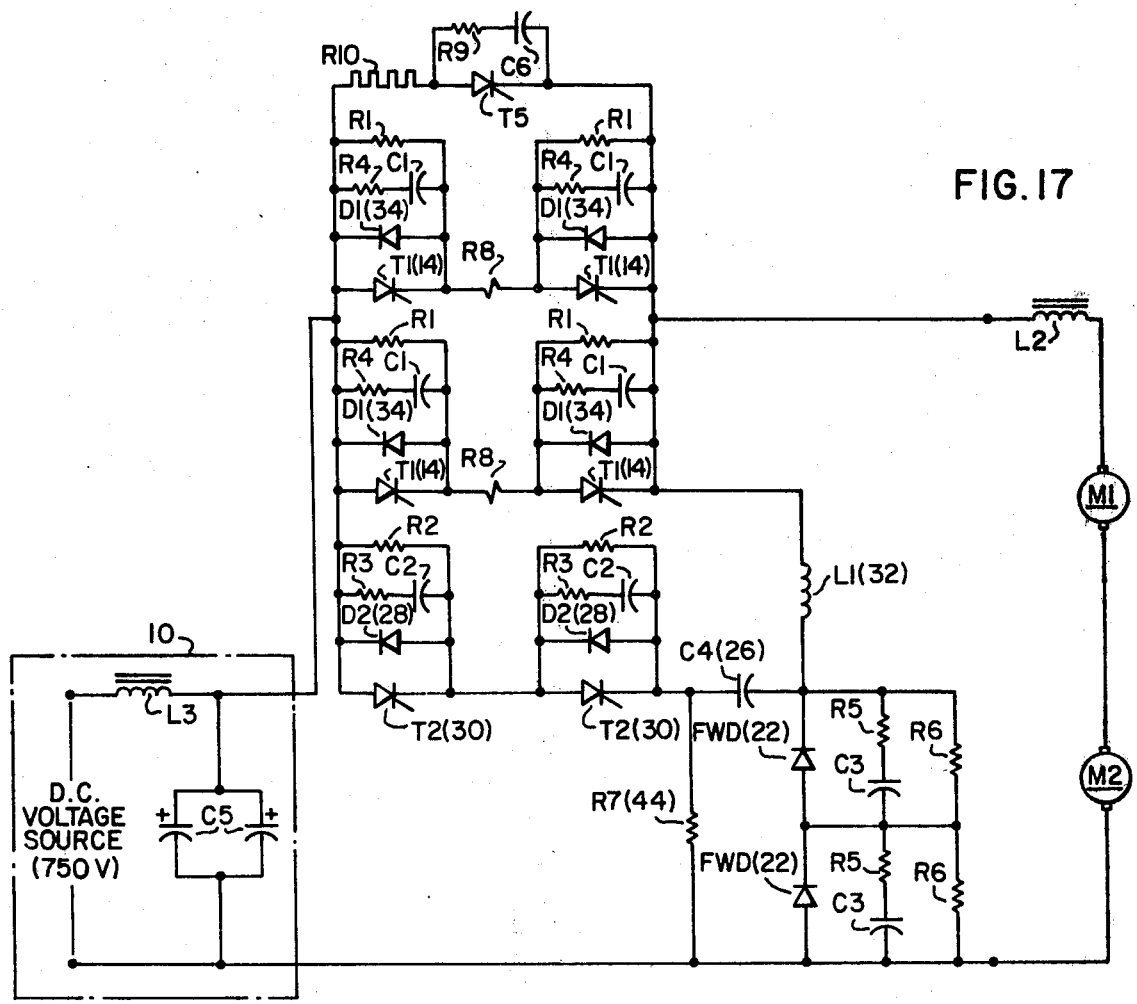
FIG. 17 is a schematic showing of the present chopper apparatus.

In FIG. 17 there is provided a schematic showing of the present chopper apparatus for supplying in the order of 800 amperes of current to series connected DC traction motors from a direct current voltage source of 750 volts nominal and 1000 volts maximum. The capacitors C5 function as input filter devices, the circuits including R5 and C3 shunting the free wheeling diodes FWD provide AC voltage balance and the resistors R6 provide DC voltage balance.

Figure 18:
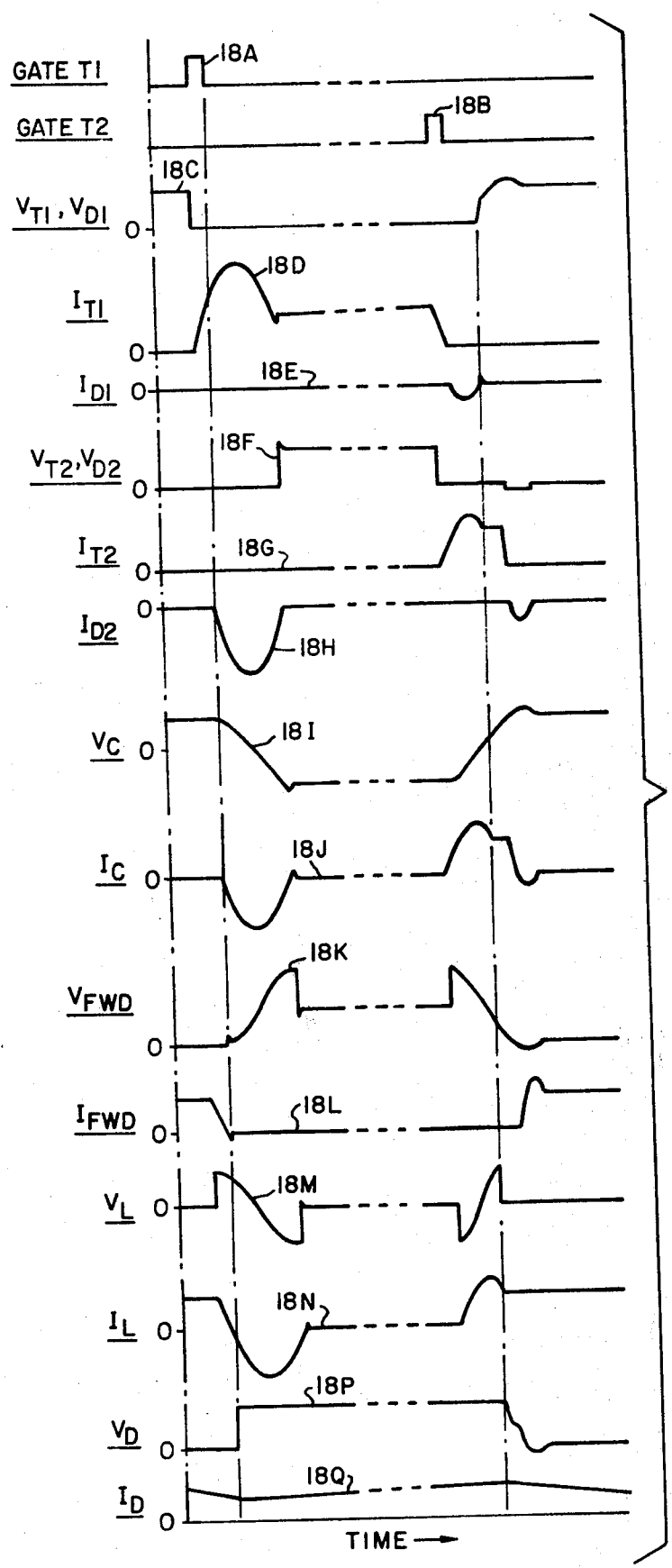
FIG. 18 shows current and voltage waveforms of the chopper apparatus to illustrate the operation of that apparatus.

In FIG. 18 current and voltage waveforms as a function of time are shown to illustrate the operation of the present chopper apparatus. The curve 18A shows the ON control pulse applied by the conduction control apparatus 15 to the thyristor switch device or controlled rectifier 14, and the curve 18B shows the ON control pulse applied to the thyristor switch device or controlled rectifier 30. The curve 18C shows the voltage characteristic of the diode 34 and the controlled rectifier 14. The curve 18D shows the current through the controlled rectifier 14 in relation to the load current $I_L$. The curve 18E shows the current through the diode 34. The curve 18F shows the voltage characteristic of the controlled rectifier 30 and the diode 28. The curve 18G shows the current through the controlled rectifier 30. The curve 18H shows the current through the diode 28. The curve 18I shows the voltage characteristic of the capacitor 26. The curve 18J shows the current through the capacitor 26. The curve 18K shows the voltage characteristic of the diode 22. The curve 18L shows the current through the diode 22. The curve 18M shows the voltage characteristic of the inductor 32. The curve 18N shows the current through the inductor 32. The curve 18P shows the voltage characteristic of the output across terminals 36 and 38, and the curve 18Q shows the output current.

800 Ampere Chopper Apparatus Components In Relation To FIG. 17

| Component | Rating |
| --- | --- |
| T1 Thyristor (14) | 900 Amperes RMS, 1200V |
| T2 Thyristor (30) | 700 Amperes RMS, 1200V |
| T5 Thyristor | 1200 Amperes RMS, 2200V |
| D1 Diode (34) | 550 Amperes RMS, 1200V |
| D2 Diode (28) | 550 Amperes RMS, 1200V |
| FWD Diode (22) | 900 Amperes RMS, 2000V |
| L1 Inductor (32) | 28 μH, Air Core |
| C4 Capacitor (26) | 80 μF |
| C1, C2, C6 Capacitor | .25 μF, 2000V |
| C3 Capacitor | 1 μF, 2000V |
| C5 Electrolytic Capacitor | 5000 μF, 1500V |
| R1, R6 | 3K ohms |
| R7 (44) | 3K ohms |
| R2 | 10K ohms |
| R4, R3 | 15 ohms |
| R5 | 10 ohms |
| R9 | 100 ohms |
| R10 | Braking Resistor |
| R8 | .0045 ohms |

During a prolonged OFF period of the thyristor 30, and with the resistor 44 shown in FIG. 1 having a higher value, such as the 3000 ohms set forth in the above 800 ampere chopper apparatus components list, a periodic ON pulse is required for the thyristor 30 to sustain the desired charge voltage for the capacitor 26. However, as an alternative embodiment of the present chopper apparatus, the resistor 44 could have a lower value in the order of 1000 ohms to provide a holding current flow through the thyristor 30 to sustain the desired charge voltage for the capacitor 26, while extending the ON control pulse provided to the thyristor 30 as shown by dotted lines in FIG. 6 to prevent turn-off of the thyristor 30 during the time that the over-voltage of the commutating capacitor 26 is clamped to the voltage of the voltage source 10.

We claim:

1. In chopper apparatus operative with a direct current voltage source and having an output for controlling the energization of a load, the combination of
   first controllable rectifier means connected to provide a load current path between said voltage source and said output,
   conduction control means for determining the ON condition of operation of the first controllable rectifier means to supply current to said output,
   commutation means for determining the OFF condition of operation of the first controllable rectifier means and including a capacitor and an inductor coupled with the first controllable rectifier means,
   second controllable rectifier means connected between the voltage source and said capacitor for providing a first direction voltage charge to said capacitor, and
   charging means operative with said first controllable rectifier means and connected with said capacitor and said voltage source for providing a current path to maintain a predetermined second direction voltage charge of said capacitor in relation to said voltage source.

2. The chopper apparatus of claim 1, with said charging means maintaining said second direction voltage charge by current flow through the first controllable rectifier means during said ON condition of operation of said first controllable rectifier means of the chopper apparatus.

3. The chopper apparatus of claim 1, with said charging means including a diode clamp being operative to hold the voltage charge on said capacitor to a substantially fixed value in relation to a given voltage source.

4. In load energization control apparatus operative with a voltage source and having an output for energizing a load, the combination of
   first means connected to provide current to said load through a path between said voltage source and said output,
   second means connected to initiate the current conduction of said first means to supply current to said output,
   third means connected to terminate the current conduction of said first means and including a capacitor coupled with said first means,
   fourth means connected across said output and responsive to current provided by said first means for holding a predetermined voltage charge to said capacitor,
   fifth means including a diode and an inductor connected across said output for providing a load current path when the current conduction of said first means is terminated,
   with said capacitor being connected to provide a conductive path for the reverse recovery current of said diode when the current conduction of said first means is initiated.

5. The load energization control apparatus of claim 4, with said capacitor and said first means being connected to shunt said inductor when the current conduction of said first means is initiated.

6. The load energization control apparatus of claim 4, with said capacitor and said first means being connected with said diode to limit the voltage buildup across said diode to permit said diode to recover at substantially zero voltage when the current conduction of said first means is initiated.

7. In chopper apparatus having an input for connection with a voltage source and having an output for connection to energize a load, the combination of
   first means connected to establish a load current path between said input and said output and having an ON condition of operation for providing load current to said output and an OFF condition of operation,
   second means including a capacitor and determining said OFF condition of operation of said first means, with said second means having an ON condition of operation for providing a first polarity voltage charge to said capacitor and an OFF condition of operation,
   with said first means providing current when in said ON condition of operation to effect a second polarity voltage charge to said capacitor,
   third means connected with said first means and said second means for determining the ON condition of operation of each of said first means and said second means,
   with said third means determining the ON condition of operation for said first means when said capacitor is charged to said first polarity voltage and determining the ON condition of operation for said second means when said capacitor is charged to said second polarity voltage, and
   fourth means connected with said capacitor for maintaining the second polarity voltage charge to said capacitor with said current provided by the ON condition of operation of said first means.

8. In chopper apparatus having an input for connection with a voltage source and having an output for connection to energize a load, the combination of
   first controlled rectifier means connected to establish a first current path from said input to said output,
   second controlled rectifier means including a capacitor and connected to establish a second current path from said input to said output,
   with said second controlled rectifier means when conductive providing a first voltage charge on said capacitor and with said first controlled rectifier means when conductive providing a current to effect a second voltage charge on said capacitor,
   control means connected with said first controlled rectifier means for determining the conduction of said first controlled rectifier means when the capacitor has said first voltage charge and connected with said second controlled rectifier means for determining the conduction of said second controlled rectifier means when the capacitor has said second voltage charge, and
   means including a resistor connected across said output for providing a charging current path to maintain said second voltage charge on said capacitor.

9. The chopper apparatus of claim 8, with the charging current path providing means including said resistor having a predetermined value in relation to continuing the conduction of the second controlled rectifier means as determined by said control means.

10. The chopper apparatus of claim 10, with said fourth means including said resistor connected in series with said capacitor for determining the voltage charge on said capacitor when the first controlled rectifier means is conductive.

11. The chopper apparatus of claim 8, with said fourth means includingsaid resistor connected in series with said capacitor and across said output for determining the voltage charge of said capacitor when said first controlled rectifier means is conductive.

12. In chopper apparatus operative with a direct current voltage source and having an output for controlling the energization of a load, the combination of first controllable rectifier means connected to provide a load current path between said voltage source and said output, conduction control means for determining the ON condition of operation of the first controllable rectifier means to supply current to said output, commutation means for determining the OFF condition of operation of the first controllable rectifier means and including a capacitor and an inductor coupled with the first controllable rectifier means, second controllable rectifier means connected between the voltage source and said capacitor and having an ON condition of operation for providing a voltage charge to said capacitor, and means including a resistor connected with said second controllable rectifier and said voltage source for providing a holding current for maintaining the ON condition of operation of the second controllable rectifier means limiting the rate of change of current through at least one of said first and second controllable rectifier means.

* * * * *